(12) United States Patent
Svensson

(10) Patent No.: US 6,564,516 B1
(45) Date of Patent: May 20, 2003

(54) SUPPORT STRUCTURE FOR ELEVATED RAILED-VEHICLE GUIDEWAY

(76) Inventor: Einar Svensson, 19686 Sunshine Way, Bend, OR (US) 97702

( * ) Notice: Subject to any disclaimer, the term of this patent is extended or adjusted under 35 U.S.C. 154(b) by 0 days.

(21) Appl. No.: 09/673,033
(22) PCT Filed: Apr. 8, 1999
(86) PCT No.: PCT/US99/07659
§ 371 (c)(1), (2), (4) Date: Dec. 6, 2000
(87) PCT Pub. No.: WO99/51455
PCT Pub. Date: Oct. 14, 1999

Related U.S. Application Data

(60) Provisional application No. 60/107,485, filed on Nov. 6, 1998, and provisional application No. 60/081,337, filed on Apr. 8, 1998.

(51) Int. Cl.[7] .............................................. B61B 13/04
(52) U.S. Cl. .......................... 52/174; 52/143; 52/296; 104/118; 104/120; 104/124; 105/141
(58) Field of Search ................................. 104/119, 120, 104/121, 124, 118; 105/141, 147; 14/71.1, 69.5, 75, 73; 52/174, 143, 296

(56) References Cited

U.S. PATENT DOCUMENTS

| | | | |
|---|---|---|---|
| 1,600,767 A | 9/1926 | Lockwood | |
| 3,710,727 A | 1/1973 | Svensson | |
| 4,042,308 A | 8/1977 | Freedman | |
| 4,274,336 A | * 6/1981 | Pater et al. | 104/124 |
| 4,313,383 A | * 2/1982 | Parazader | 104/124 |
| 4,382,412 A | * 5/1983 | Sullivan | 104/124 |
| 4,665,830 A | 5/1987 | Anderson et al. | |
| 5,386,782 A | * 2/1995 | Dinis et al. | 104/124 |
| 5,511,488 A | * 4/1996 | Powell et al. | 104/232 |
| 5,651,318 A | 7/1997 | O'Donohue | |
| 6,182,576 B1 | * 2/2001 | Svensson | 104/120 |

FOREIGN PATENT DOCUMENTS

DE          33 35 058          4/1985

* cited by examiner

Primary Examiner—Carl D. Friedman
Assistant Examiner—Brian E. Glessner
(74) Attorney, Agent, or Firm—Klarquist Sparkman, LLP

(57) ABSTRACT

A guideway and support structure (50) for supporting an elevated guideway (52) for a railed-vehicle (54) include individual unassembled components sized for easy transport. The components may be prefabricated with known materials and methods and transported to an installation site to be assembled together. The support structure (50) is preferably cantilevered and sized to support one or two vehicle guideways (52). The support structure (50) may include a pile foundation (56) for improved support during seismic activity and to facilitate installation on existing streets and sidewalks without covering or interfering with underground plumbing or utilities. Preferably, multiple sections of the guideway (52) are rigidly secured together through expansion joints (51) to define a continuous guideway (53) such that loads on the guideway (53) are distributed over multiple columns (60).

26 Claims, 18 Drawing Sheets

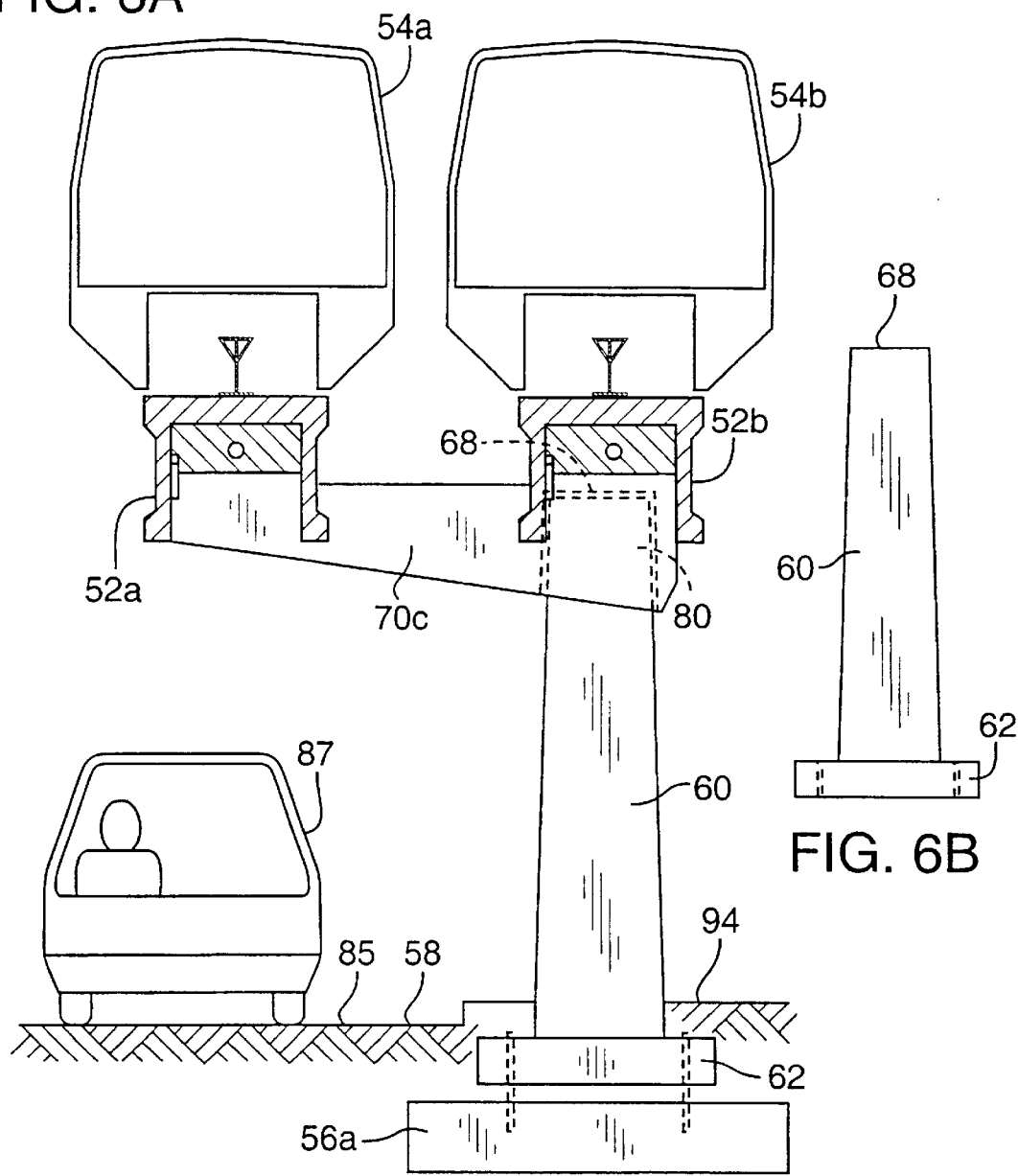

SUPPORT STRUCTURE FOR ELEVATED RAILED-VEHICLE GUIDEWAY

This application claims the benefit of U.S. Provisional Application No. 60/081,337 filed on Apr. 8, 1998 and U.S. Provisional Application No. 60/107,485 filed on Nov. 6, 1998.

The present invention relates to a support structure for elevating a railed-vehicle guideway, such as a monorail guideway. The invention concerns, more particularly, an elevated monorail guideway support structure and guideway constructed of prefabricated components that are easily transported to and assembled together at the installation site. It preferably includes a pile foundation for improved support during seismic activity and to facilitate installation on existing streets and sidewalks without covering or interfering with underground plumbing or utilities.

BACKGROUND OF THE INVENTION

Elevated railed-vehicle systems, such as monorails, have numerous benefits, particularly in overcrowded urban environments where the surface streets are congested with traffic and traditional forms of mass transportation, such as buses, must compete for space with existing traffic. For example, a dedicated elevated guideway vehicle system operates above city streets and therefore is immune from traffic congestion. It provides a quick and convenient way for moving people around a city, and it actually helps to relieve traffic congestion.

However, existing elevated railed-vehicle systems have several characteristics that have precluded their wide acceptance throughout the world. First, known support structures used to elevate the guideway are heavy and excessively large making them expensive to construct and install. Such structures are difficult to prefabricate at a central manufacturing facility and then transport easily to the location where they will ultimately be installed. Accordingly, the support structures must be individually manufactured directly on the site where they will be used. This time and expense of manufacturing such structures is a primary contributor to the excessive costs of elevated rail systems. In addition, variations in weather, temperature, and environment at each individual support structure manufacturing site combined with variations associated with continuously having to move and set-up the manufacturing equipment at each site make it difficult to efficiently control the quality and consistency of each manufactured support structure.

Also, because of space limitations in urban environments, it is desirable to position elevated railed vehicle systems over existing surface streets. However, in such cases, it is difficult to position known support structures for supporting the guideway so as to not interfere with at least one vehicle traffic lane below the guideway. One way to avoid disrupting street traffic is to position such support structures adjacent to existing roads, such as on sidewalks, instead of on the road itself. Such positioning prevents the support structures from blocking at least one lane of traffic.

However, placement of known support structures adjacent to roads is often impractical for at least two reasons. First, known support structures have wide and relatively shallow foundations. Accordingly, they cannot be easily installed adjacent to existing roadways because these foundations would cover existing underground utilities such as sewer and electric lines. Most building codes prevent placing structural foundations over such utilities. Even in cities not having such building code restrictions, it is not desirable to cover existing underground utilities with essentially immovable foundations weighing several tons.

Second, most cities have tall buildings adjacent to its sidewalks. Positioning known support structures on sidewalks would often position the elevated vehicle guideway too close to these buildings. In many cases, a vehicle running on such guideway would not be able to turn without contacting a building.

Finally, known wide and shallow elevated rail support structure foundations do not provide optimal support during seismic activities such as an earthquakes.

FIGS. 1 & 2 show an example of an elevated railed vehicle system 10 having these characteristics. They depict the Seattle monorail extending from Seattle Center to Westlake Center in Seattle, Wash., U.S.A. This system 10 was constructed in 1962, and includes a traditional spread foundation 12 under street level 14 formed by a block of reinforced concrete weighing approximately 100,000 pounds and being approximately 4 feet high (16), 15 feet wide (18) and 15 feet long (not shown). A T-shaped support 20 includes a central column portion 22, a lower end pedestal portion 24 and an upper T-shaped end portion 26. Two vehicle guideways 28a, 28b are supported one at each end of the T-shaped end portion 26.

The support 20 is one continuous unit constructed of reinforced concrete at the installation site and lifted with cranes so that the pedestal portion may be secured with anchor bolts 30 to the foundation 12. As shown in FIG. 2, because of its size and the requirement to avoid covering any underground utilities, the foundation 12 is positioned below one lane 32 of a four lane road 34 with the support 20 extending from that lane 32, leaving only three lanes available for traffic 36 on the road 34. Moreover, in order for the vehicle 38 to clear buildings 40 adjacent to the road 34, the guideways 28a, 28b must be positioned over the road 34.

Thus there remains a need for an elevated railed vehicle support structure and guideway that can be consistently and economically prefabricated off site and easily moved to the installation site, that provides a low profile foundation that can be easily installed without blocking existing underground utilities, and that permits the vehicle rail system to operate effectively over an existing road without requiring the support structure itself to occupy any lanes of that road.

SUMMARY OF THE INVENTION

Fulfilling the forgoing needs is the primary objective of the invention. More specific objectives of the invention are to provide an elevated guideway support structure for a railed-vehicle in which the support structure and guideway:
  (1) are economical to manufacture, transport and install;
  (2) are wear resistant, strong, and durable;
  (3) may be prefabricated off-site with known materials and methods;
  (4) are constructed of individual unassembled components sized and shaped for easy transport and assembly;
and also where the support structure:
  (5) is shaped to effectively support and elevate a railed-vehicle guideway over an existing road without blocking a lane of vehicle traffic on that road;
  (6) is capable of supporting a plurality of railed-vehicle guideways;
  (7) effectively supports an elevated railed-vehicle guideway in a cantilevered manner;
  (8) includes a foundation that may be installed near existing underground utilities without covering those utilities;

(9) includes a foundation that provides improved support during seismic activities;

(10) provides a low cost, easy to maintain, reliable, relatively simple and inexpensive solution to the known problems of elevated guideway support structures for a railed-vehicle.

The invention is an improved guideway and support structure for supporting an elevated guideway for a railed-vehicle having individual unassembled components sized for easy transport that may be prefabricated with known materials and methods and transported to and assembled together at the installation site. The support structure is preferably cantilevered and sized to support one or two vehicle guideways. It may include a pile foundation for improved support during seismic activity and to facilitate installation on existing streets and sidewalks without covering or interfering with underground plumbing or utilities.

BRIEF DESCRIPTION OF THE DRAWINGS

FIG. 6A is an elevation view of an elevated guideway support structure of the present invention having a traditional spread foundation and a cantilever support supporting two vehicle guideways.

FIG. 6B is an elevation view of the column of FIG. 6A.

FIG. 6C is an elevation view of the cantilever support of FIG. 6A rotated 90° from its operative orientation.

DETAILED DESCRIPTION OF PREFERRED EMBODIMENTS

Figure 1:
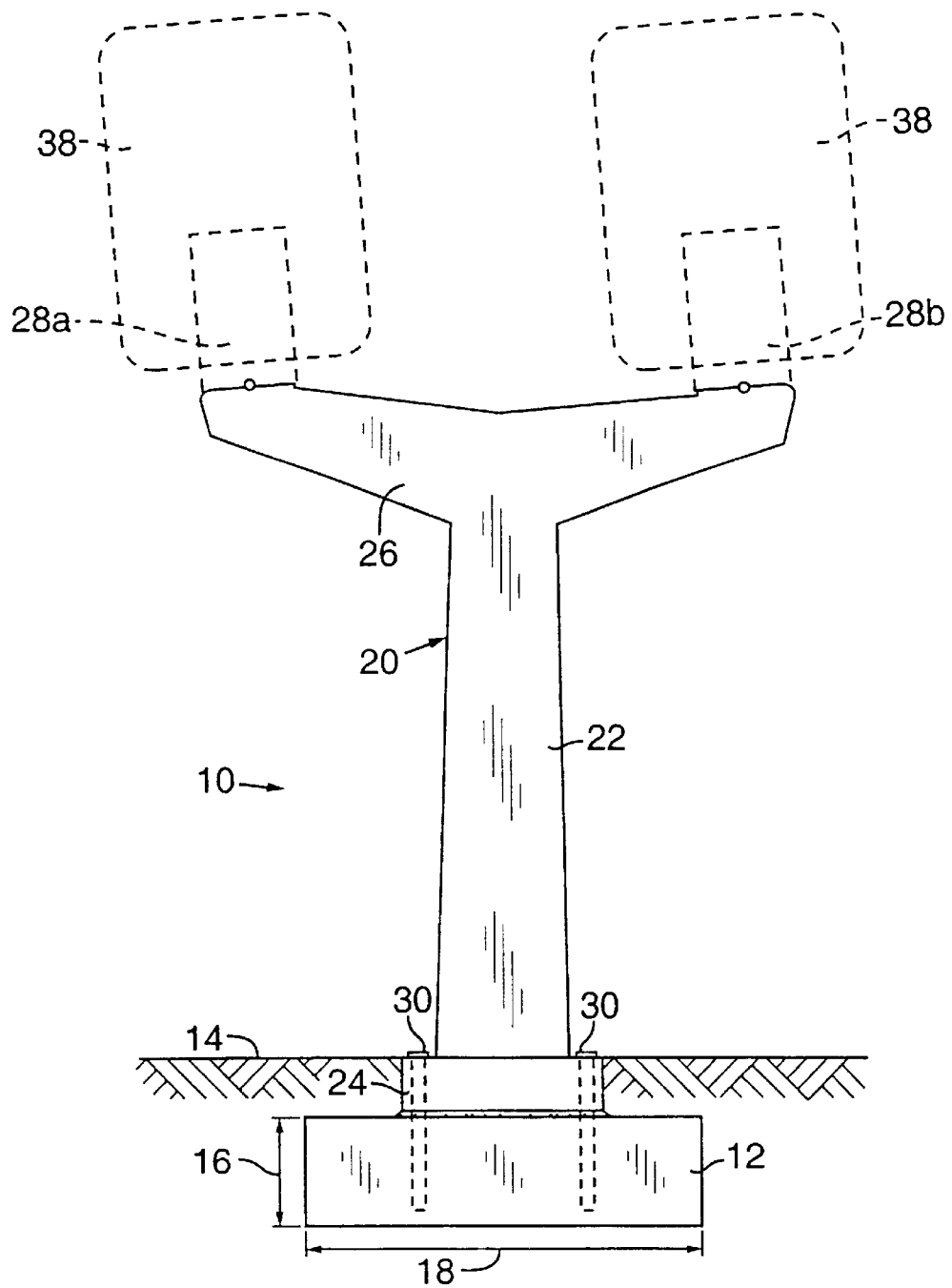
FIG. 1 (Prior Art) is an elevation view of a prior art elevated guideway support structure for a railed-vehicle having a traditional spread foundation.

A support structure 50 for an elevated railed-vehicle guideway 52 constructed according to several embodiments of the invention is shown in FIGS. 3A–8B.

General Manufacturing and Assembly

To provide comprehensive disclosure without unduly lengthening the specification, this specification hereby incorporates by reference the disclosures of U.S. Pat. No. 3,710,727 to Svensson which issued on Jan. 16, 1973 and U.S. Pat. No. 5,845,581 to Svensson which issued on Dec. 8, 1998. These references provide greater detail regarding the construction, installation and use of guideways on an elevated railed-vehicle system. In general, a guideway 52 (52a,b shown), also known as a railway, track, or rail, is used by a railed-vehicle 54 (54a,b shown), such as a monorail, to define a predetermined path for supporting and guiding the vehicle 54.

Referring now to FIGS. 3A and 6A–D, the general support structure 50 of an elevated guideway 52 (52a,b shown) for a railed-vehicle 54 (54a,b shown) includes a foundation 56 imbedded within the ground 58 and a vertical column 60 extending above the ground 58 and having a pedestal end 62 secured to the foundation 56 with known means, such as high strength prestressed bolts 64 extending from the foundation through mounting holes 66 received in the pedestal end 62 and bolted in place as shown in FIGS.

Figure 6D:
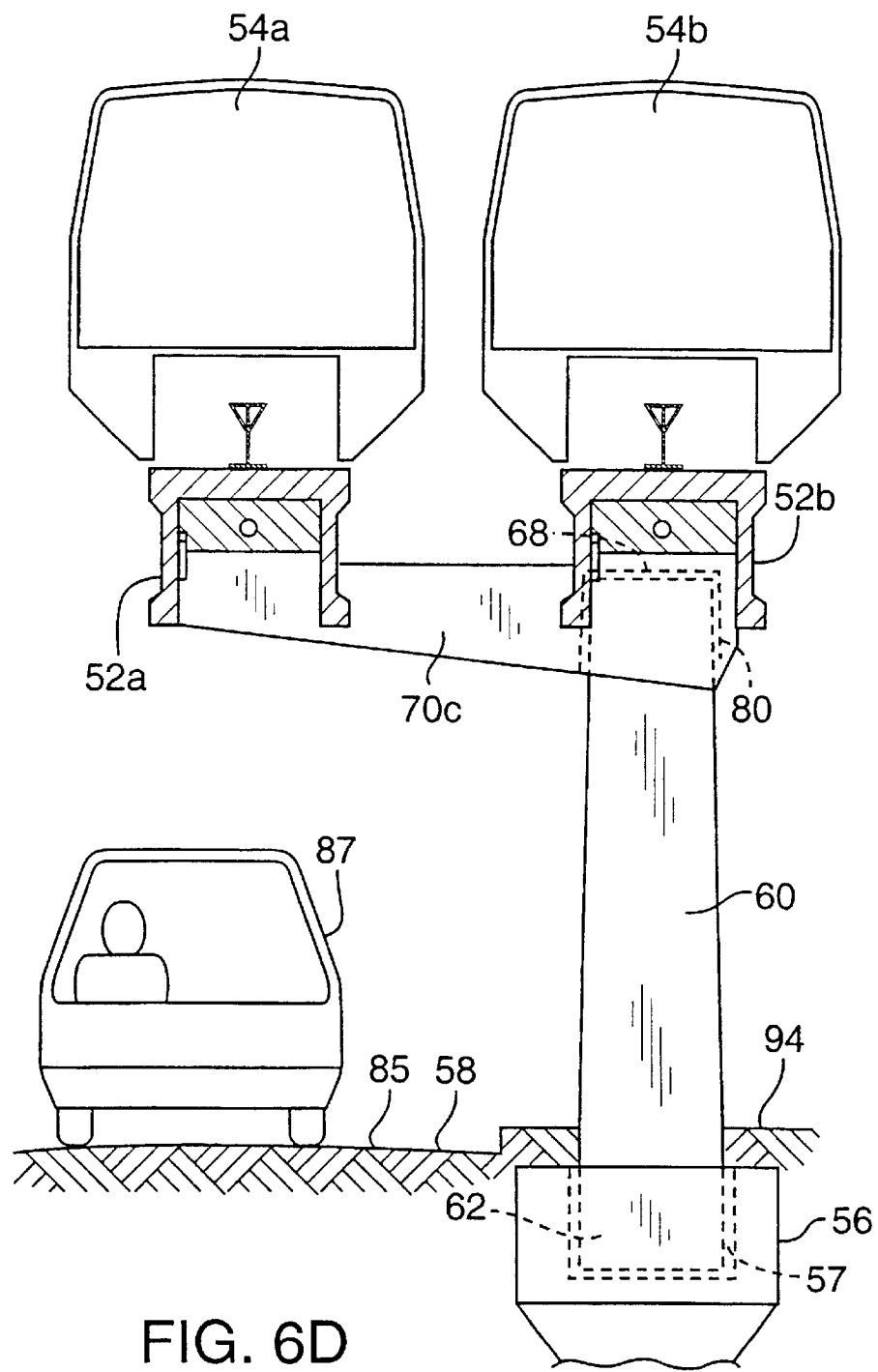
FIG. 6D is an elevation view of an elevated guideway support structure of the present invention having an alternative preferred spread foundation with a recess for attaching the vertical column.

3A and 6A or positioning the pedestal end 62 within a conforming recess 57 within the foundation 56 and grouting the column 60 in place as shown in FIG. 6D. The opposite end 68 of the column 60 has mounted therein a guideway support 70. A Y-shaped support 70a is shown here. The ends 72a, 72b of the support include means for attaching guideways 52a, 52b to the support 70, such as with high strength prestressed bolts 74. Each guideway 52a, 52b may include an opening 76 for receiving electrical power and communication cables and the like, and preferably has a width 53 (FIG. 3A) less than the width 55 (FIG. 3A) of the railed vehicle 54a. More preferably, width 53 is less than half of width 55.

In general, the foundation 56 is preferably constructed with reinforced concrete that is poured into place with known materials and methods. In cases where mounting bolts 64 (FIG. 3A) will secure the column 60 to the foundation 56, they are mounted in the concrete before it sets. Preferably grouting 65 is secured between the pedestal end 62 and the foundation 56.

Figures 3A, 3B, 3C:
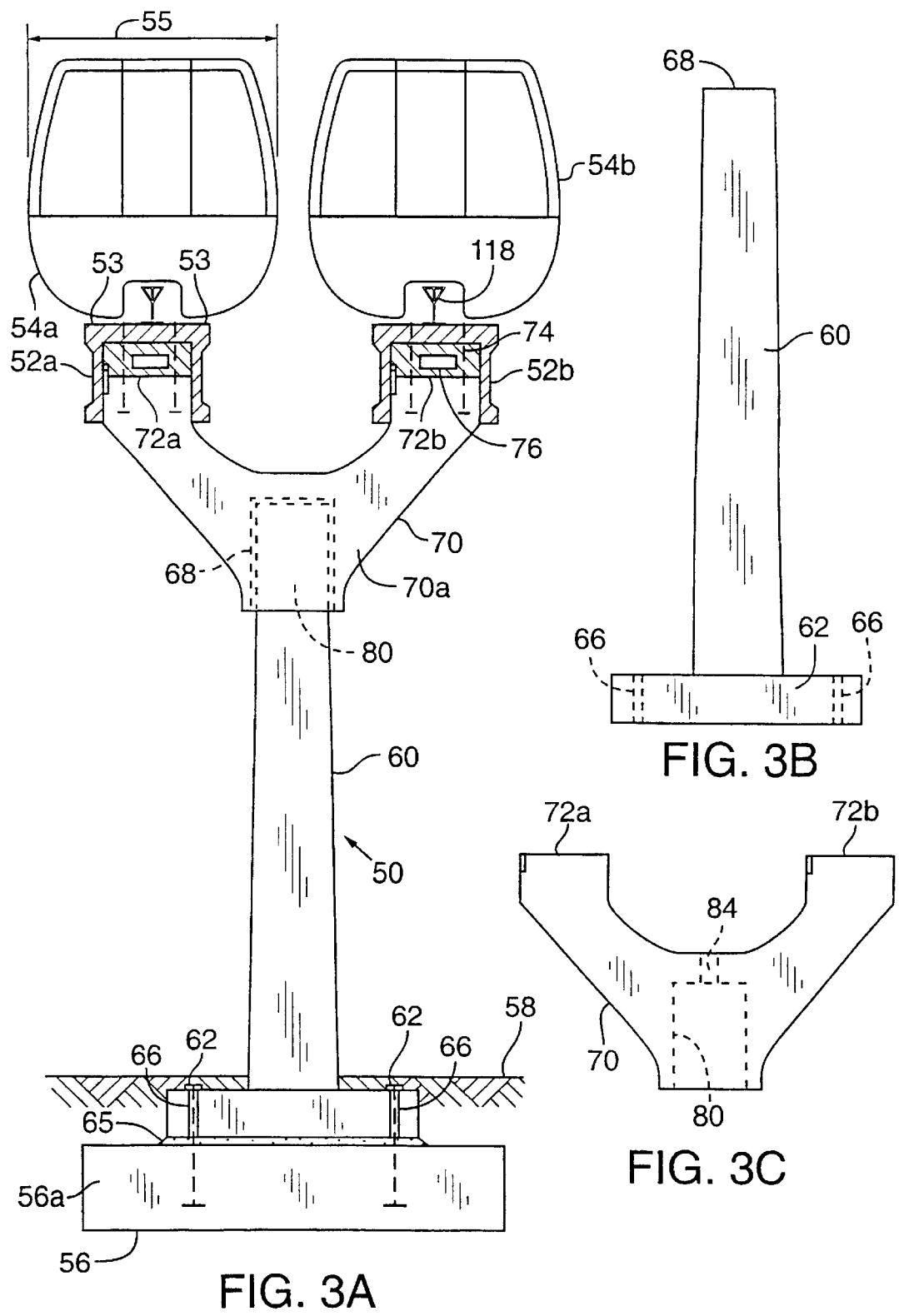
FIG. 3A is an elevation view of an elevated guideway support structure of the present invention having a traditional spread foundation and a symmetrical Y-shaped column support supporting two guideways.
FIG. 3B is an elevation view of the column of FIG. 3A.
FIG. 3C is an elevation view of the symmetrical Y-shaped column support of FIG. 3A rotated 90° from its operative orientation.

As best shown in FIGS. 3B and 3C, the vertical column 60 and support 70 are preferably separate components, each sized and shaped to permit them to be prefabricated off-site, such as at a central manufacturing facility, with known materials and methods. For example, the column 60 and support 70 may be constructed of reinforced concrete, steel or composite materials and easily transported to the installation site. If desired and as best shown in FIGS. 9A–D, the guideway 52 can also be constructed with prefabricated materials that are assembled on-site.

Figure 10A:
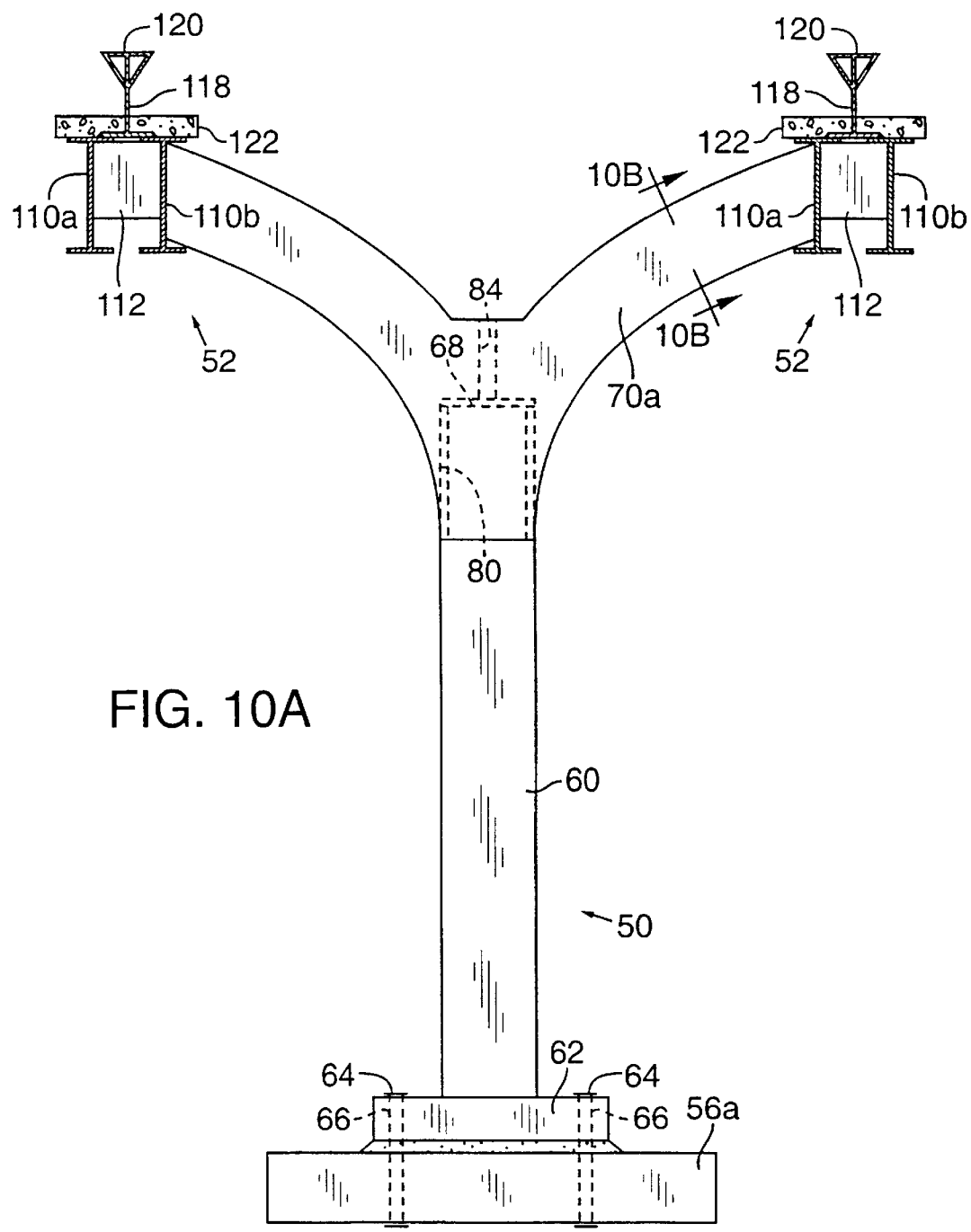
FIG. 10A is an elevation view of an elevated guideway support structure of the present invention having a traditional spread foundation and a symmetrical Y-shaped column support supporting two prefabricated guideways.
Figure 10B:
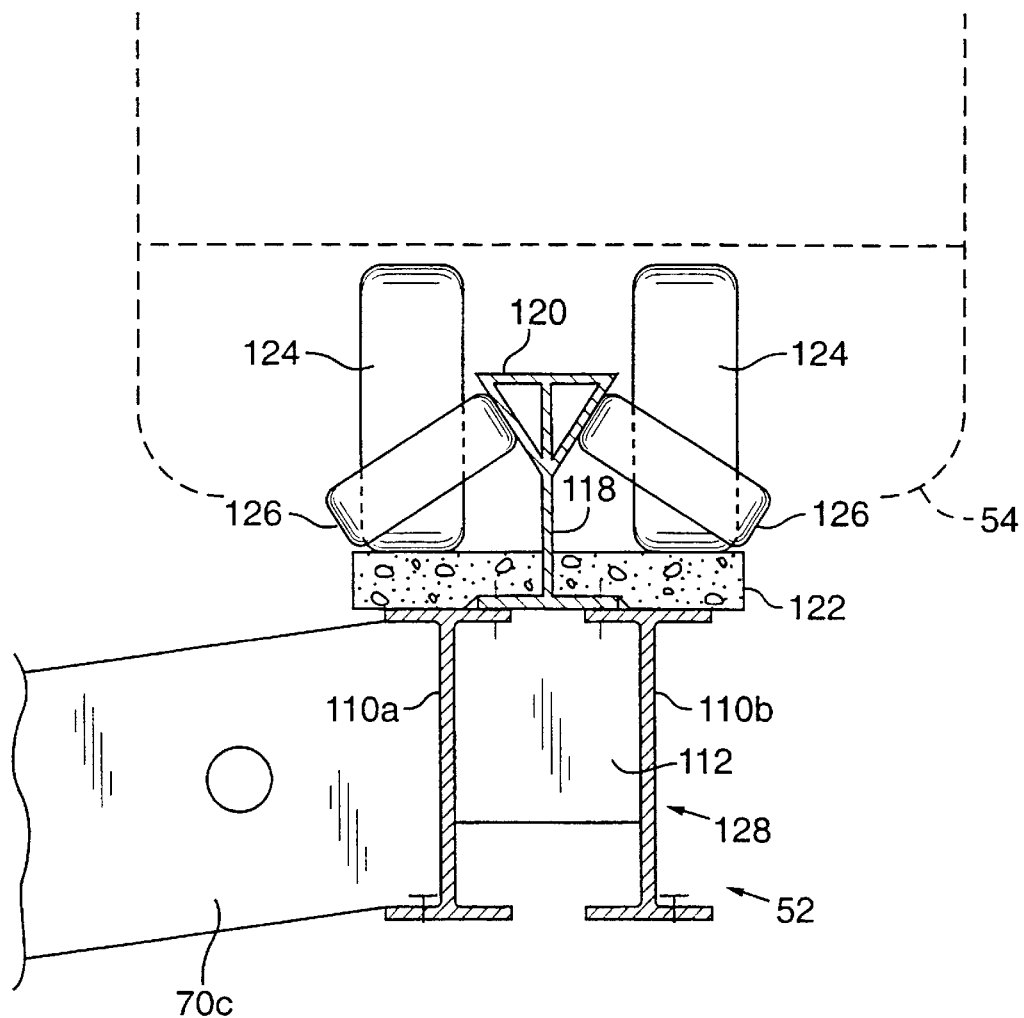
FIG. 10B is an enlarged fragmentary view of the elevated guideway support of FIG. 10A taken along line 10B—10B of FIG. 1A.
Figure 10D:
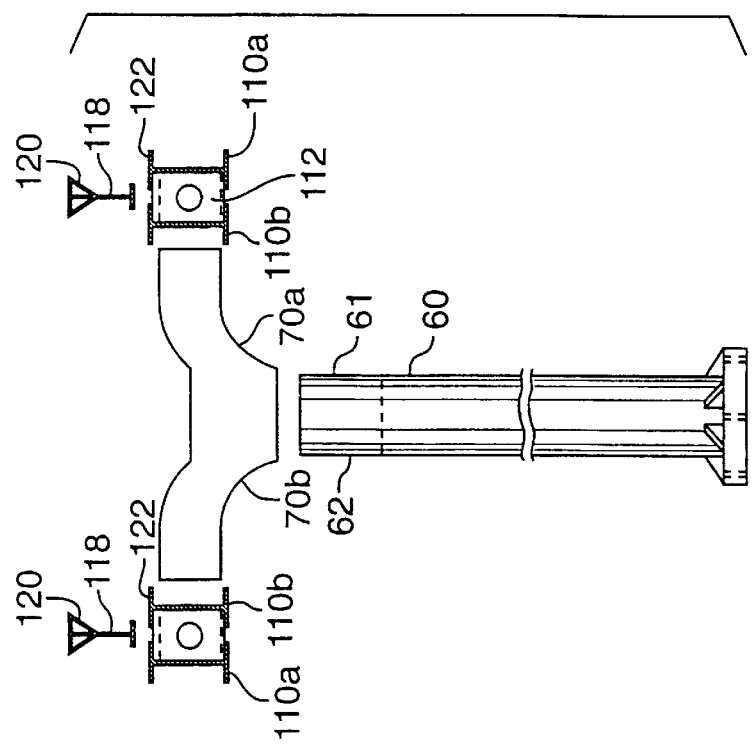
FIG. 10D is an exploded view of the elevated guideway support structure of FIG. 10C.
Figure 10C:
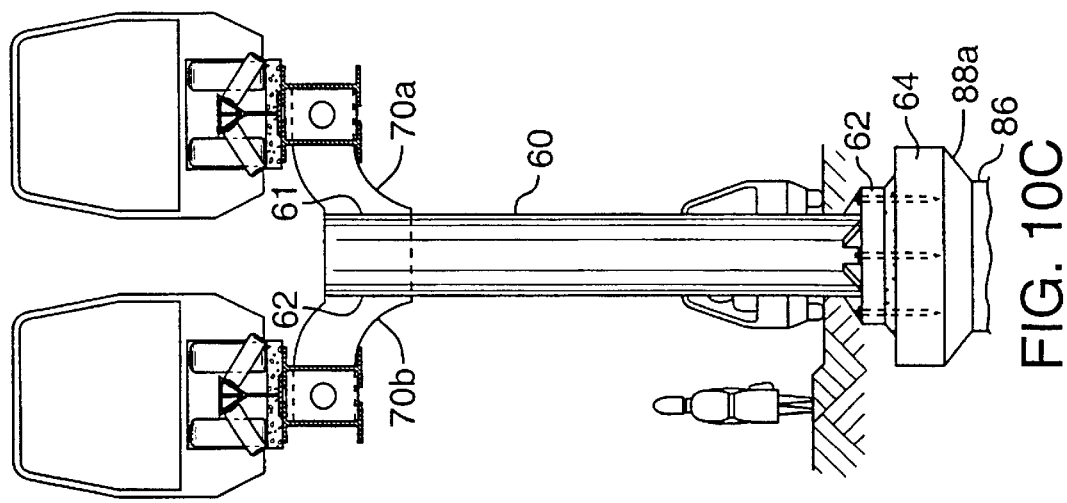
FIG. 10C is an elevation view of an elevated guideway support structure of the present invention having a pile foundation and a resilient symmetrical Y-shaped column support supporting two prefabricated guideways.

As best shown in FIGS. 3A–C, the support 70 and column 60 include attachment means for easily attaching them together, preferably at the installation site. One known attachment means includes the support 70 having a recess 80 sized and shaped to snugly receive the end 68 of the column 60 and be supported by the column 60. The column 60 and support 70 are secured in place with known materials and methods, such as with grouting. In such case, it is desirable to include a grouting opening 84 in the support 70 for ease of introduction of grouting. Examples of other attachment means could include bolts or other fasteners common to the type of material used on the column 60 and support 70. Alternatively, and as shown in FIGS. 10C and 10D, the support 70 may be secured within a recess 61 within the column 60.

The particular material used for the support structure 50 can vary depending on the type of vehicle 54 that will run on the guideway 52, the overall weight needed to be supported, and the environmental conditions in which the vehicle 54 will run. Suitable alternative building materials include steel or other alloys, reinforced plastic, and composite materials. For example, in situations where the vehicle 54 is driven by magnetic levitation means, it is usually desirable to construct the guideways 52a, 52b, and possibly the support structure 50, with a suitable non-magnetic material, such as reinforced plastic or the like.

Figure 2:
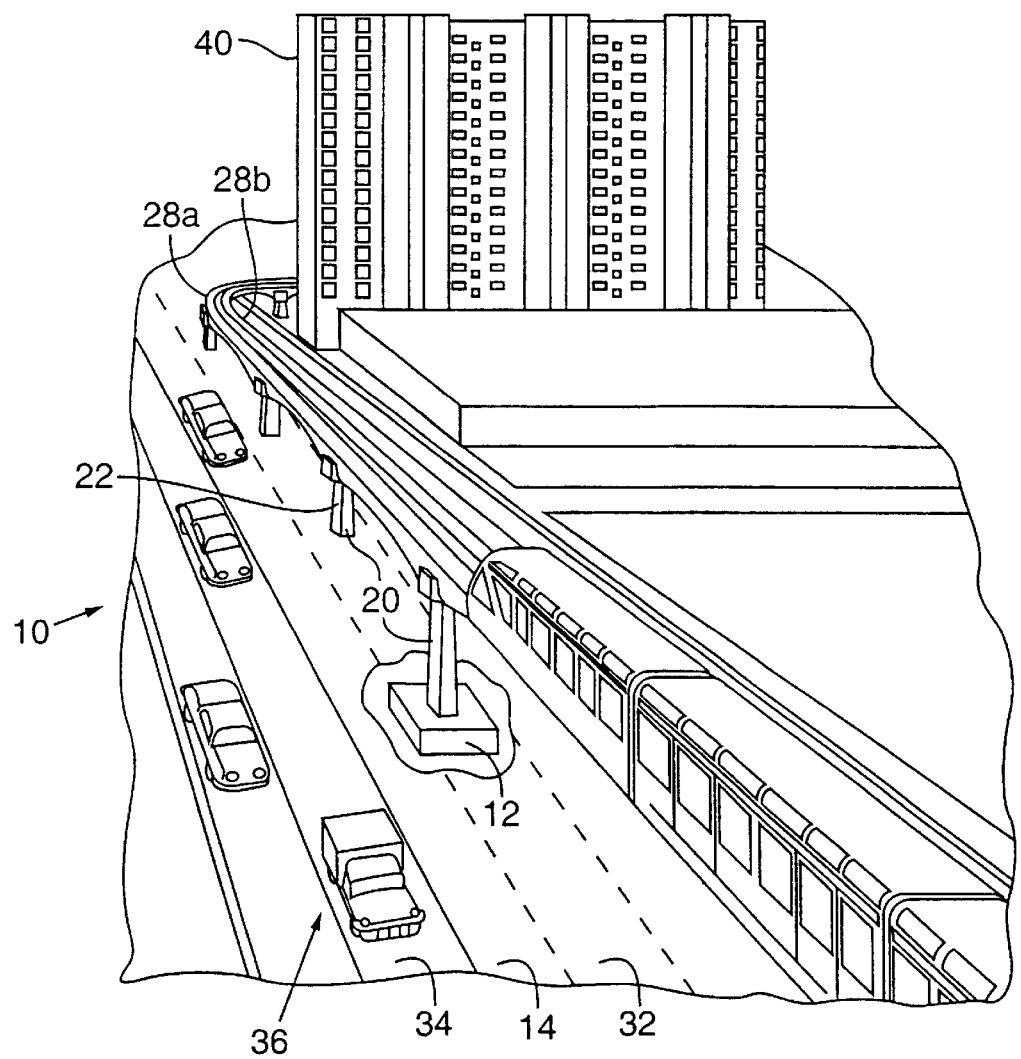
FIG. 2 (Prior Art) is an isometric view of a prior art support structure of FIG. 1 in use.

The smaller size of the column 60 and guideway support 70 components making up the support structure 50 compared to the known uni-body support structures 20 as shown in FIGS. 1 and 2, make these components lighter and more portable. Therefore, these components can be mass produced at a central manufacturing facility, then loaded onto trucks, trains, or ships and transported worldwide. In situations where the column 60 must be particularly long, it may be manufactured in sections and assembled on-site for ease of transport. For even greater ease of transportation, the sections may be sized to fit within each other for transport. The mass production of these components at a climate and quality controlled central facility results in reduced costs and increased quality of each support structure 50.

Detailed Description of Preferred Guideway Supports

Figure 10F:
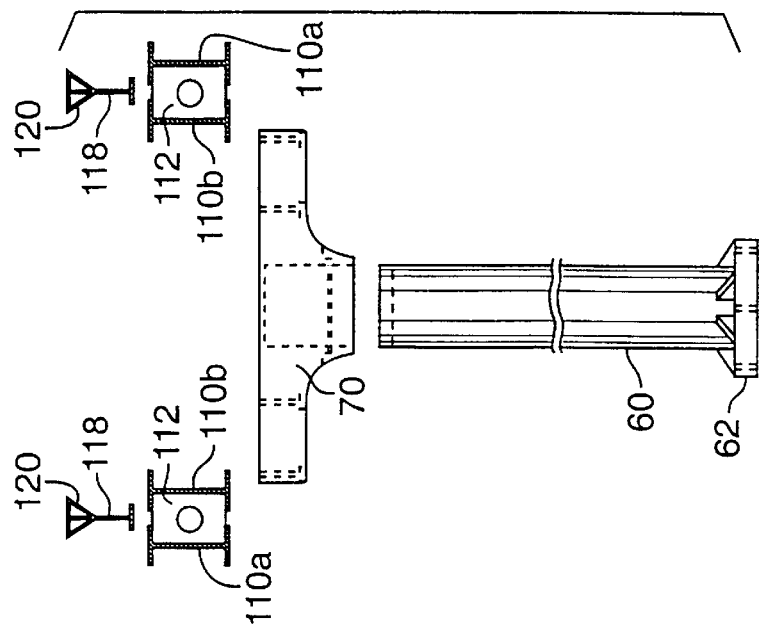
FIG. 10F is an exploded view of the elevated guideway support structure of FIG. 10E.
Figure 10E:
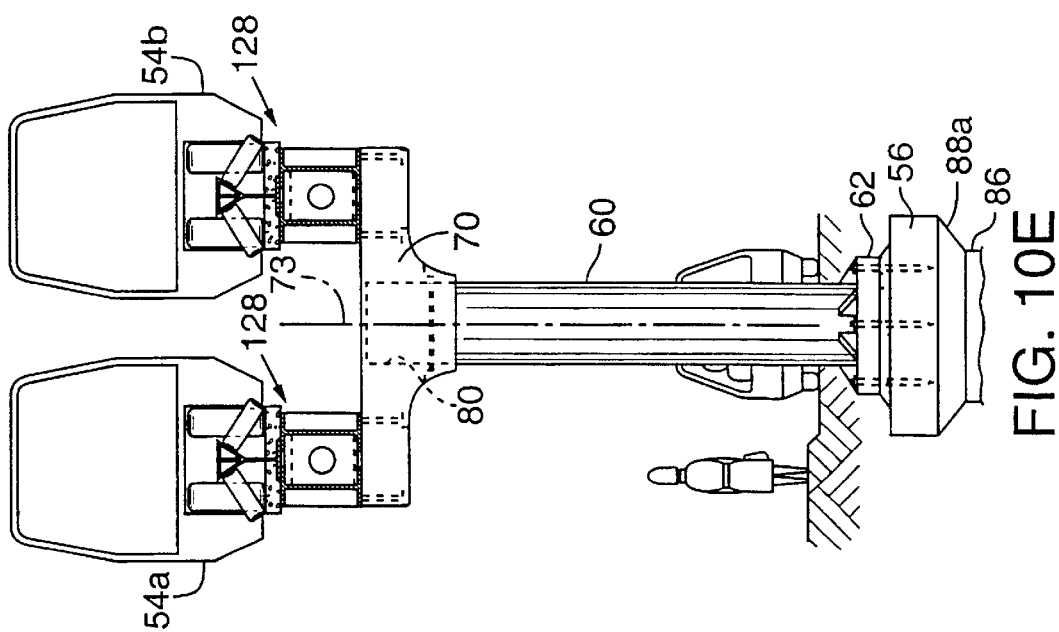
FIG. 10E is an elevation view of an elevated guideway support structure of the present invention having a pile foundation and a resilient symmetrical T-shaped column support supporting two prefabricated guideways.

Within this basic framework of the present invention, it should be appreciated that the particular shape of the support 70 may be readily modified to accommodate single or multiple guideways, and to position the guideways 52a, 52b at optimal locations with respect to the column 60. For example, and as previously discussed, FIGS. 3A and 3C show a Y-shaped guideway support 70a permitting one guideway 52a, 52b to be positioned on each end of the Y-shaped support 70a. FIGS. 10E and 10F show a T-shaped guideway support 70. Similarly, as shown in FIGS. 12A–12E the cross-sectional shape of the support 70 and column 60 may be modified to accommodate a particular design, structural, material, or aesthetic need.

Figure 4:
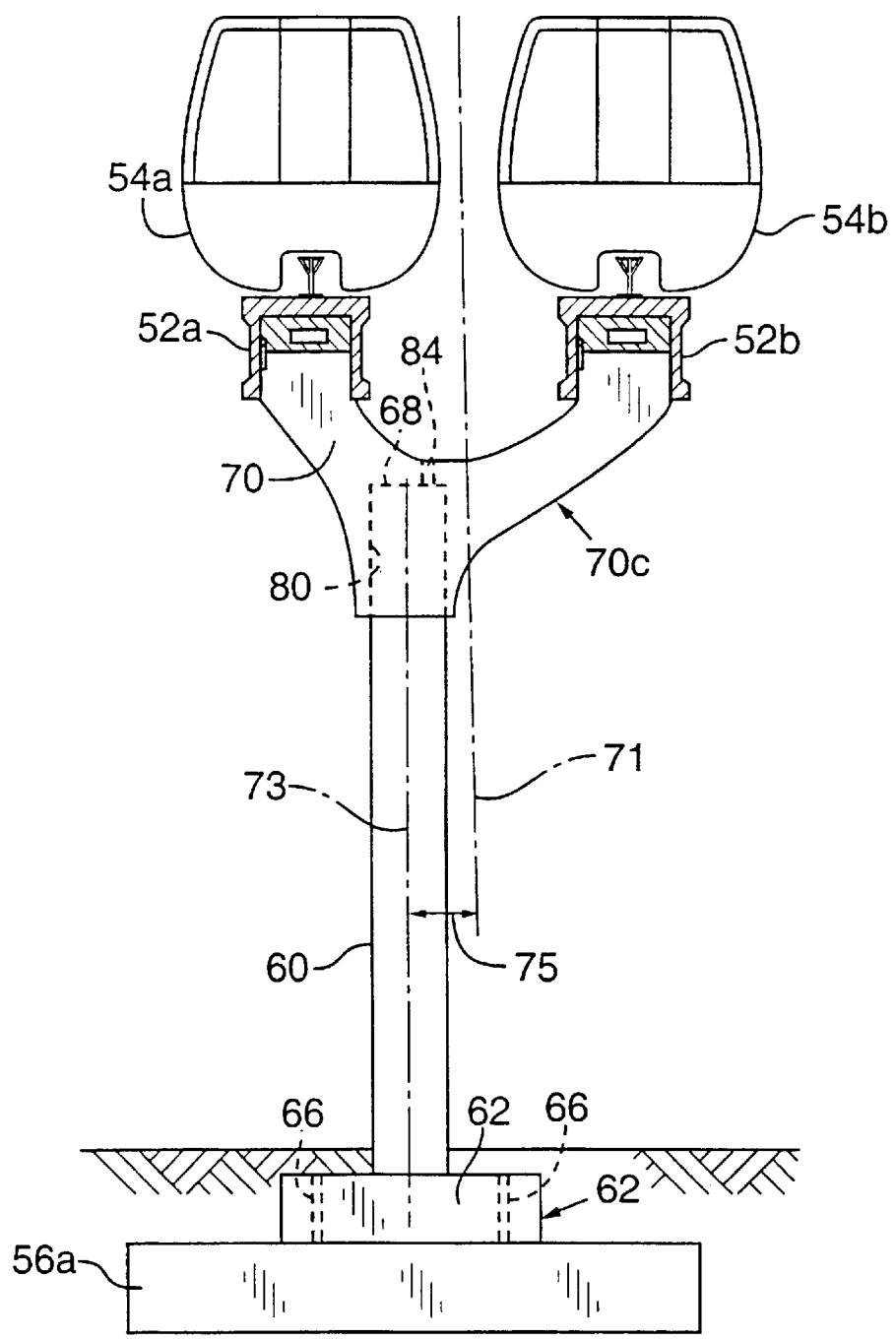
FIG. 4 is an elevation view of an elevated guideway support structure of the present invention having an offset Y-shaped support supporting two guideways.

Referring now to FIG. 4, an offset Y-shaped guideway support 70b may also be used. With this support 70b, the centerline 71 of the two guideways 52a, 52b is displaced from the centerline 73 of the column 60 by a predetermined offset 75 as shown. The offset 75 permits one of the guideways (here guideway 52a) to be positioned closer to the column 60, thereby permitting the column 60 to be placed closer to existing structures without risk of the vehicle 54 contacting obstacles such as adjacent buildings.

Figure 5:
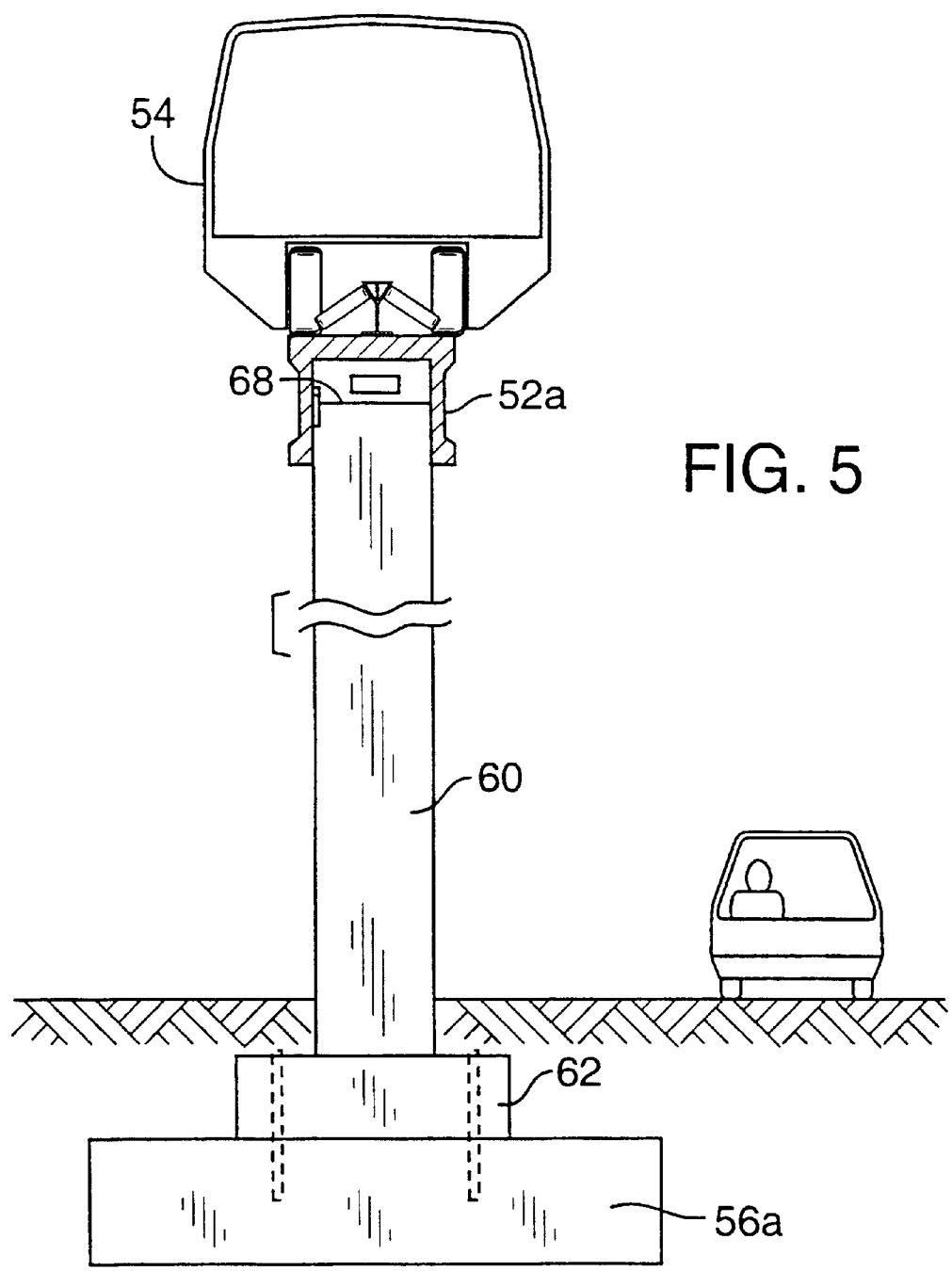
FIG. 5 is an elevation view of an elevated guideway support structure of the present invention having an elevated single guideway.

Referring now to FIG. 5, in cases where it is desirable to have only one elevated guideway 52a, it may be placed directly on the prefabricated column 60 as shown.

Also, as shown in FIGS. 6A–8B, the guideway support 70c may be cantilevered from the column 60 as shown in FIGS. 6A–8B. Cantilevering the guideway support 70c as shown, permits the column 60 to be secured to a foundation 56a positioned adjacent to a road 85, thereby allowing all lanes of the road below the guideways 52a, 52b to remain open for vehicular traffic 87. Preferably, one (FIG. 7A) or two (FIG. 6A) guideways may be secured to the cantilevered guideway support 70c.

Detailed Description of Preferred Support Structure Foundations

The foundation 56 for each support structure 50 may be modified depending on the particular installation circumstances present at the location where a particular support structure will be installed. In many situations it is desirable to use a traditional spread foundation 56a as previously described and shown in FIGS. 1A, 3A, 5A, and 6A. Its wide and shallow structure, preferably of rebar reinforced poured concrete, offers a strong and stable foundation from which to attach the column 60 connected to any of the previously described guideway supports 70a,b,c (FIGS. 3A, 4, 5, 6A, and 7A).

Alternatively, as shown in FIGS. 7A–8B, a pile foundation 56b can also be used. The pile foundation 56b is formed with known materials and methods by boring a cylindrical hole into the ground 58, and filling it with a suitable foundation materials, such as steel rebar reinforced concrete to form a deep cylindrical structure 86 of foundation material. One known method to construct the pile foundation 56b includes using a rotary drill to drill and simultaneously excavate the soil. A steel cason pipe made in sections and having the same diameter as the drill is inserted during excavation to support the soil during excavation and form a mold for forming the pile. A prefabricated reinforcement cage is then inserted into the mold and concrete is poured in and allowed to harden forming the pile foundation 56b.

Preferably the ends of the structure 86 have belled-out portions 88a, 88b as shown that are also formed with a suitable foundation material, such as reinforced concrete. In cases where mounting bolts 64 (FIG. 7A) are used to secure the column 60 to the foundation 56b, they are secured within the upper belled-out portion 88a before the concrete sets. Alternatively, the column 60 may be secured within a conforming recess 57 in the foundation as shown in FIG. 6D and grouted in place.

The result is a long, narrow foundation 56b that may be easily positioned without covering underground utilities such as water pipes 90 or sewer lines 92. Accordingly, the pile foundation 56b is particularly useful for positioning the support structure 50 on sidewalks 94 which have several underground utilities running beneath them. Moreover, the deep penetration and belled-out end portions 88a, 88b of the foundation 56b increase the overall stability of the foundation, particularly to resist seismic conditions such as earthquakes.

Detailed Description of Preferred Guideways

The support structure 50 will support a wide variety of guideways 52 including those disclosed in U.S. Pat. No. 3,710,727 to Svensson which issued on Jan. 16, 1973 and U.S. Pat. No. 5,845,581 to Svensson which issued on Dec. 8, 1998.

Preferably, the guideway is constructed with relatively small, lightweight components that may be easily manufactured off-site and transported to the installation area. One such guideway 52 is shown in FIGS. 9A–D. A pair of prefabricated box girders, or longitudinal I-beams, 110a, 110b arranged parallel to each other and secured together with stiffener plates 112 to form a box girder assembly 128 extends between and is supported by successive support structures 50. The box girder assembly can be supported by any of the guideway supports 70a–c, or directly by the column 60 as previously described. If desired, it may also be attached to the sides of these structures as, shown in FIGS. 10A and 10B.

Figure 9A:
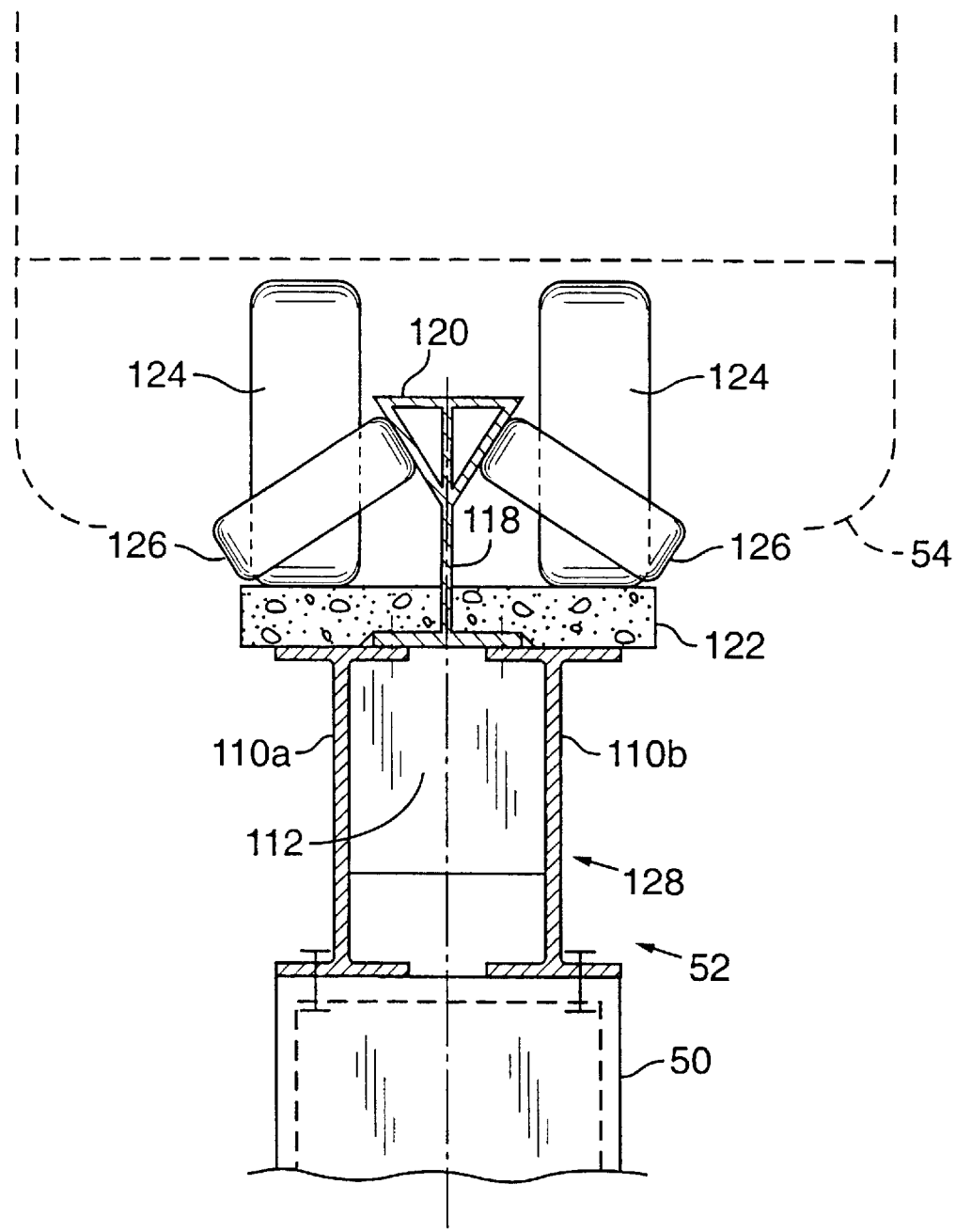
FIG. 9A is a cross-sectional elevation view of a prefabricated guideway in accordance with a preferred embodiment of the present invention having a railed-vehicle thereon.
Figure 9D:
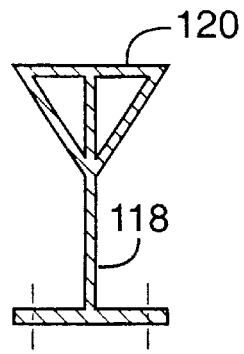
FIG. 9D is a cross-sectional elevation view of the guide rail of the guideway of FIG. 9A.
Figure 9C:
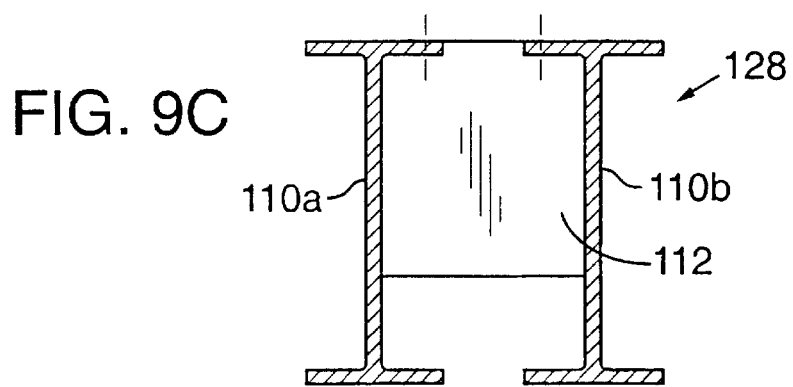
FIG. 9C is a cross-sectional elevation view of the box girders of the guideway of FIG. 9A.
Figure 9B:
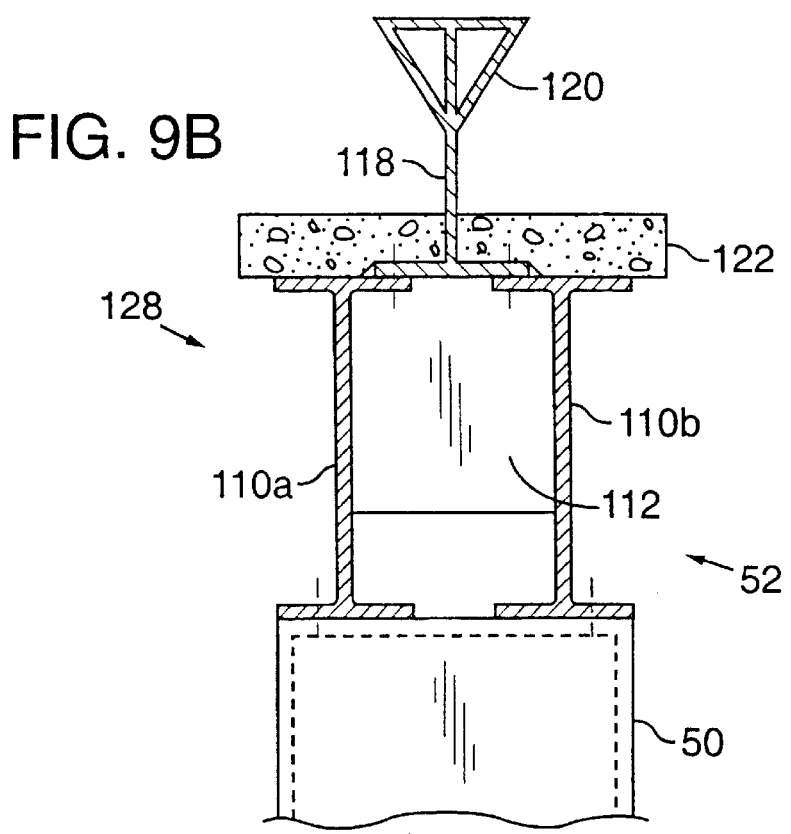
FIG. 9B is a cross-sectional elevation view of the guideway of FIG. 9A without a railed-vehicle thereon.

A guide rail 118, preferably constructed of an elongate I-beam and having an upwardly and outwardly extending head 120, is secured on top of and centrally aligned between the pair of box girders 110a, 110b as shown in FIG. 9A. A vehicle runway 122, preferably constructed of steel reinforced concrete, is placed. on top of the box girders 110a, 110b and adjacent to the guide rail 118 as shown. The box girders 110a, 110b, guide rail 118, stiffener plates 112 and runway 122 can be made with any suitable materials including steel, reinforced plastic, composite materials, or high strength, slender prestressed concrete.

Preferably during use, a railed-vehicle 54 having a plurality of drive wheels 124 and guide wheels 126 travels along the vehicle runway 122. In particular, the drive wheels 124 are supported by the vehicle runway 122, while the guide wheels 126 follow the upwardly and outwardly extending head 120 of the guide rail 118.

In light of the prefabricated components used, assembling the guideway 52 on-site is simplified. First, the pair of box girders 110a, 110b are secured together with stiffener plates 112 by known methods such as bolting or soldering to form a box girder assembly 128. The box girder assembly 128 may be assembled remotely or on-site. The box girder assembly 128 is then lifted into position so that it rests horizontally on and is suspended between two successive support structures 50. The box girder assembly 128 is then secured to each support structure 50. Then, the guide rail 118 is secured in place on the top of the box girder assembly 128 with known means and methods such as welding or bolting. Finally, the runway 122 is constructed on top of the box girder assembly 128 by forming a mold and precision pouring concrete of sufficient thickness within that mold.

Figure 11:
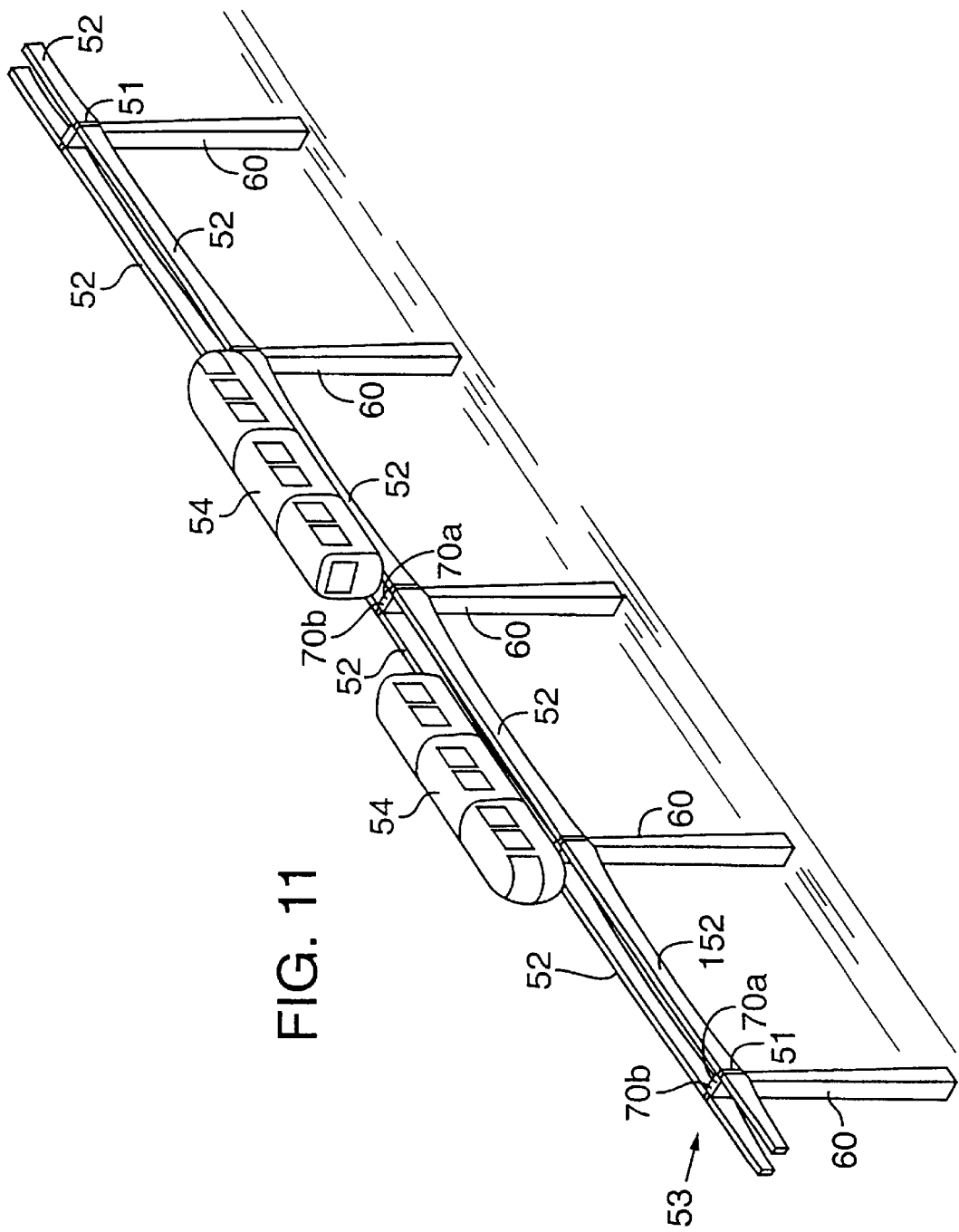
FIG. 11 is an isometric view of several elevated guideway support structures to show possible alignment and application.
Figure 12A:
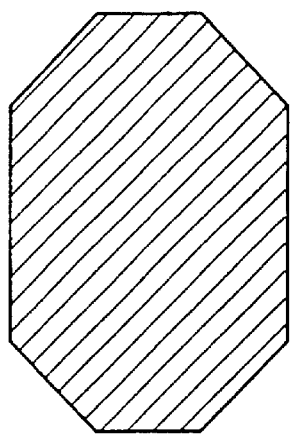
FIGS. 12A–E show possible cross-sectional shapes for the vertical support and guideway supports of the present invention.
Figure 12B:
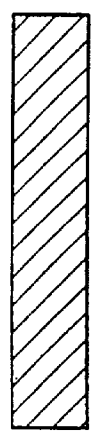
Figure 12C:
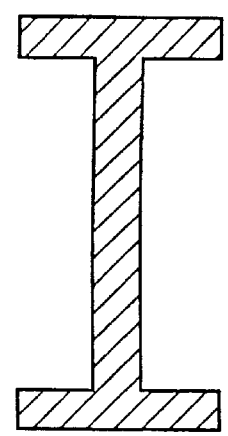
Figure 12D:
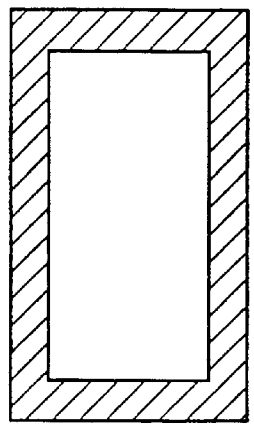
Figure 12E:
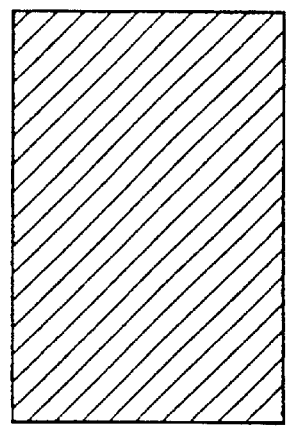

Successive sections of the guideway 52 may be formed in the same manner and joined together to form a continuous elongate guideway 53. As shown in FIG. 11, an expansion joint 51, preferably a dual expansion column, is provided at predetermined distances along the elongate guideway 53, preferably at every 4 to 6 sections of guideway 52. In such case, and as best shown in FIGS. 10C–D and 11B, supports 70a and 70b are sized, shaped and constructed with suitable materials to deflect or flex slightly in response to loads exerted on the guideway 53. Such loads include loads associated with traveling and braking trains, the expansion of materials associated with temperature effects, and slight displacement associated with normal settling of foundations. With such an elongate guideway, the longitudinal forces such as braking, wind, and temperature forces are distributed over five columns 60 for an elongate guideway 53 comprising four sections of guideway 52 between expansion joints 51 and seven columns for an elongate guideway 52 comprising six sections of guideway 52 between expansion joints. Distributing these forces over multiple columns 60 allows each column to be more slender and of lighter weight than prior art columns.

Moreover, curved-shaped box girders 110a, 110b and guide rails may be used to make curved guideway sections.

Description of Selected Preferred Embodiments

In light of the variety in guideway support shapes 70a,b,c and available support structure foundations 56a,b, a variety of combinations of these elements are available to accommodate the particular support structure needs of a given project. The following descriptions provide a representative sample of the various combinations of these elements. It is not intended to be exhaustive.

A first preferred combination of elements is shown in FIGS. 3A–3C. It features the symmetrical Y-shaped guideway support 70a supporting two guideways 52a,b. The support is secured to column 60 which rests on a traditional spread foundation 56a.

FIG. 4 shows a second preferred combination where the column 60 rests on a traditional spread foundation 56a with the offset Y-shaped guideway support 70b supporting two guideways 52a,b. A third preferred combination is shown in FIG. 5 which shows the same column 60 and foundation 56a of FIG. 4 supporting a single guideway 52a without any sort of independent guideway support there between.

FIGS. 6A–6C show a fourth preferred combination whereby the cantilevered guideway support 70c supports two guideways 52a,b. The support 70c is secured to column 60 which rests on a traditional spread foundation 56a.

Figure 7A:
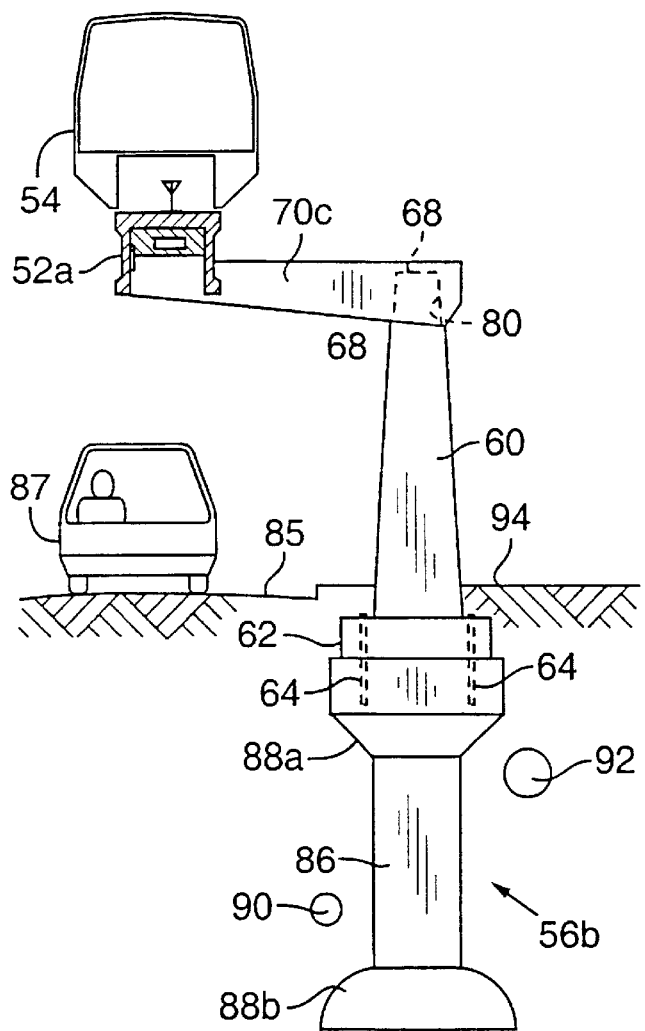
FIG. 7A is an elevation view of an elevated guideway support structure of the present invention having a pile foundation and a cantilever column support supporting one guideway.
Figure 7B:
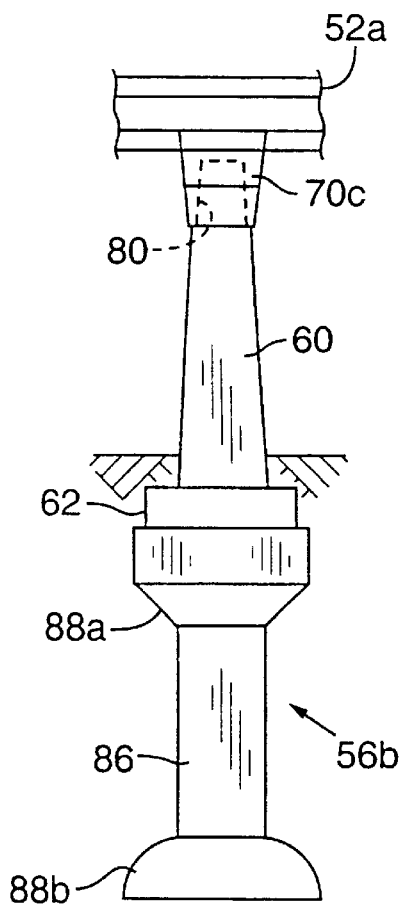
FIG. 7B is a side view of the support structure of FIG. 7A.
Figure 8A:
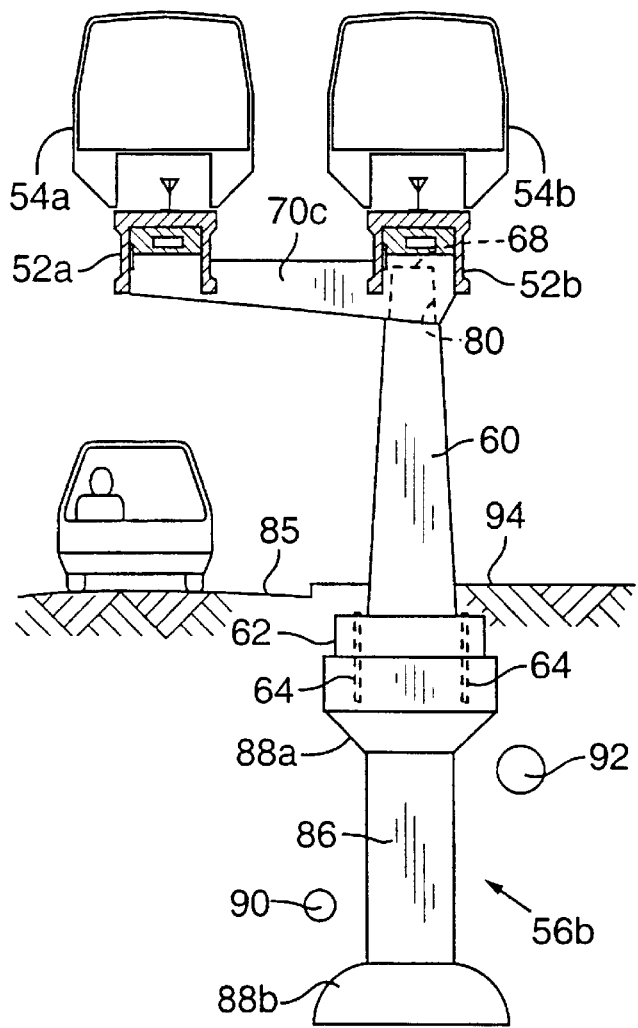
FIG. 8A is an elevation view of an elevated guideway support structure of the present invention having a pile foundation and a cantilever column support supporting two guideways.
Figure 8B:
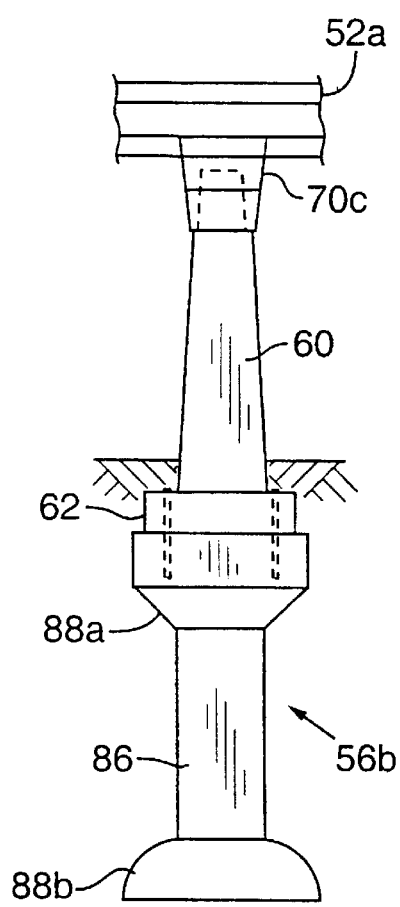
FIG. 8B is a side view of the support structure of FIG. 8A.
Figures 8C, 8D:
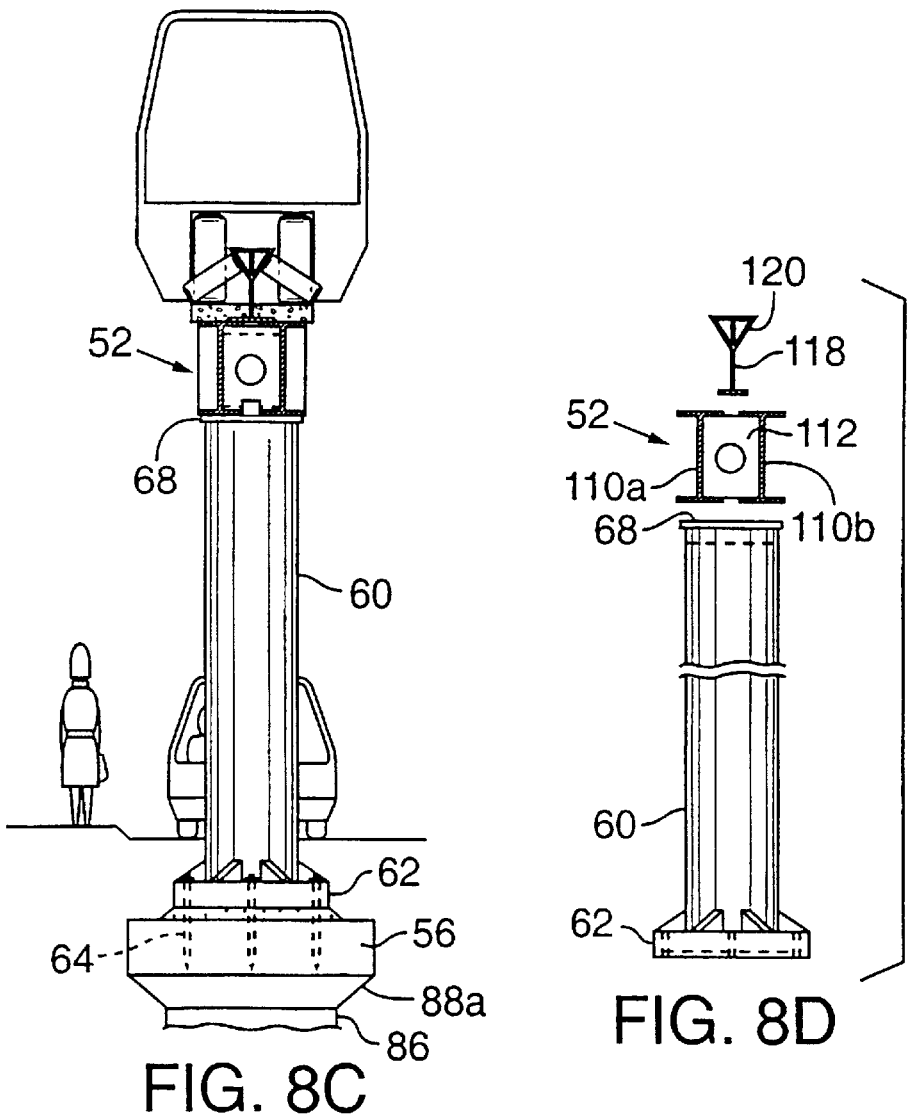
FIG. 8C is an elevation view of an elevated guideway support structure of the present invention having a pile foundation a vertical column having a circular cross-section supporting a single elevated guideway.
FIG. 8D is an exploded view of the support structure of FIG. 8C.

A fifth preferred combination is shown in FIGS. 7A–7B which show the cantilevered guideway support 70c supporting one guideway 52a, and the support 70c is supported by column 60 which rests on pile foundation 56b. The sixth preferred combination, shown in FIGS. 8A–8B, includes the basic configuration of the fifth preferred combination, except the cantilevered guideway support 70c supports two parallel guideways 52a, 52b.

Preferred Support Structure Construction Method

As previously noted, it is desirable to mass produce the column 50 and guideway support 70a,b,c at a central manufacturing facility. The specific method of mass production will depend on the type of material used. However, in situations where it is desirable to use concrete imbedded with steel rebar reinforcement, mass production would include the following steps.

First, molds of the column and guideway support are made with known materials and methods. Second, steel rebar is placed in the mold and positioned at optimal locations so as to provide the most strength to the ultimate product. Third, concrete is poured into the molds and allowed to harden. Fourth the reinforced concrete column and support are removed from the molds. This process is repeated several times resulting in a plurality of columns and supports. Finally, a sufficient supply of the columns and supports are transported from the manufacturing facility to the ultimate installation site for assembly on site as previously described.

Having described and illustrated the principles of the invention with reference to preferred embodiments thereof, it should be apparent that these embodiments can be modified in arrangement and detail without departing from the principles of the invention. For example, the column 60 and guideway support 70a,b,c may be constructed from several component parts that each may be easily transported and assembled together. Similarly, the overall shape of the column 60, guideway support 70a,b,c or foundation 56a,b may be modified to accommodate specific aesthetics or obstacles. Also, if desired, the column 50, foundation 56a,b, and guideway supports 70a,b,c may be sized and shaped to accommodate more than two guideways.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

What is claimed is:

1. A support structure for supporting an elevated monorail, said support structure comprising:
    a foundation;
    an elongate vertical column having an end sized and shaped to be attached to said foundation and an opposite end;
    a guideway support secured to said opposite end, said guideway support having a Y-shaped configuration that supports at least two guideways and elevates said at least two guideways above the foundation, said guideway support extending between said at least two guideways and said opposite end, and a width of each said guideway being adapted to be less than a width of said monorail;
    said column and said guideway support being substantially prefabricated to have a size and shape forming discrete components that may be easily transported with conventional transportation methods when not assembled together;
    one of said column and said guideway support including a mounting recess, and another of said column and said guideway support including a protrusion sized to fit snugly in said mounting recess wherein said column and said guideway support are substantially secured together by inserting said protrusion into said mounting recess; and
    whereby said column and said guideway support may be manufactured remotely, transported to a desirable installation location, and joined together at the installation location.

2. The support structure of claim 1, wherein said foundation is a pile foundation.

3. The support structure of claim 1, wherein said foundation is a spread foundation.

4. A support structure for supporting an elevated monorail, said support structure comprising:
    a foundation;
    an elongate vertical column having an end sized and shaped to be attached to said foundation and an opposite end;
    a guideway support secured to said opposite end, said guideway support having a T-shaped configuration that supports at least two guideways and elevates said at least two guideways above the foundation, said guideway support extending between said at least two guideways and said opposite end, and a width of each said guideway being adapted to be less than a width of said monorail;
    said column and said guideway support being substantially prefabricated to have a size and shape forming discrete components that may be easily transported with conventional transportation methods when not assembled together;
    one of said column and said guideway support including a mounting recess, and another of said column and said guideway support including a protrusion sized to fit snugly in said mounting recess wherein said column and said guideway support are substantially secured together by inserting said protrusion into said mounting recess; and
    whereby said column and said guideway support maybe manufactured remotely, transported to a desirable installation location, and joined together at the installation location.

5. The support structure of claim 4, wherein said guideway support is cantilevered.

6. The support structure of claim 4, wherein said foundation is a pile foundation.

7. The support structure of claim 4, wherein said foundation is a spread foundation.

8. A support structure for supporting an elevated railed-vehicle, said support structure comprising:
    a pile foundation that includes an elongate shaft having a longitudinal centerline, two end portions, and a central portion that has a cross-section with an outer edge, each said end portion including a belled-out portion that extends outward from the centerline of said shaft to a defined point further than the outer edge of said central portion, said pile foundation providing a stable foundation that does not cover underground utilities;
    an elongate vertical column having an end sized and shaped to be attached to said foundation and an opposite end;
    a guideway support secured to said opposite end such that at least one guideway is elevated above the foundation;
    said column and said guideway support being sized and shaped to be pre-fabricated and to form discrete components that may be easily transported with conventional transportation methods when not assembled together;
    one of said column and said guideway support including a mounting recess, and another of said column and said guideway support including a protrusion sized to fit snugly in said mounting recess, wherein said column and said guideway support are substantially secured together by inserting said protrusion into said mounting recess; and whereby said column and said guideway support may be manufactured remotely, transported to a desirable installation location, and joined together at the installation location.

9. A support structure for supporting an elevated railed-vehicle, said support structure comprising:

a foundation;

an elongate vertical column having an end sized and shaped to be attached to said foundation and an opposite end;

a guideway support secured to said opposite end such that at least one guideway is elevated above said foundation, said guideway including a pair of horizontally aligned pre-fabricated girders, a guide rail, and a vehicle runway, said girders being arranged parallel to each other and secured together to form a box girder, said guide rail having a vertical web supporting a head that is secured above said box girder, and said vehicle runway being positioned above said box girder;

said column and said guideway support are sized and shaped to be pre-fabricated and to form discrete components that may be easily transported with conventional transportation methods when not assembled together;

one of said column and said guideway support including a mounting recess, and another of said column and said guideway support including a protrusion sized to fit snugly in said mounting recess wherein said column and said guideway support are substantially secured together by inserting said protrusion into said mounting recess; and whereby said column and said guideway support may be manufactured remotely, transported to a desirable installation location, and joined together at the installation location.

10. The support structure of claim 9, wherein said girders are joined together with stiffeners.

11. A support structure for supporting an elevated monorail, said support structure comprising:

a foundation;

an elongate vertical column having a first end and an opposite second end, said first end being sized and shaped to attach to said foundation;

a guideway support elevated above said foundation and secured to said second end;

a guideway attached to said guideway support, the guidway comprising at least two adjoining guideway segments that form a junction between their ends that is in general vertical alignment with the column a width of said guideway being adapted to be less than a width of said monorail;

said column and said guideway support being substantially prefabricated to have a size and shape forming discrete components that may be easily transported with conventional transportation methods when not assembled together;

one of said column and said guideway support including a mounting recess, and another of said column and said guideway support including a protrusion sized to fit within said mounting recess such that said column and said guideway support are substantially secured together by inserting said protrusion into said mounting recess; and whereby said column and said guideway support may be manufactured remotely, transported to a desirable installation location, and joined together at the installation location.

12. The support structure of claim 11, wherein said guideway support is cantilevered from said column.

13. The support structure of claim 11, wherein said guideway support is configured to support at least two of said guideway.

14. The support structure of claim 13, wherein said guideway support is Y-shaped.

15. The support structure of claim 13, wherein said guideway support is T-shaped.

16. The support structure of claim 11, wherein said foundation is a spread foundation.

17. The support structure of claim 11, wherein said foundation is a pile foundation.

18. The support structure of claim 17, wherein said pile foundation includes an elongate shaft having a longitudinal centerline, two end portions, and a central portion that has a cross-section with an outer edge, each said end portion including a belled-out portion that extends outward from the centerline of said shaft to a defined point further than the outer edge of said central portion, said pile foundation providing a, stable foundation that does not cover underground utilities.

19. The support structure of claim 18, wherein said cross-section is substantially circular.

20. The support structure of claim 11, wherein said guideway includes a pair of horizontally aligned pre-fabricated girders, a guide rail, and a vehicle runway, said girders being arranged parallel to each other and secured together to form a box girder, said guide rail having a vertical web supporting a head that is secured above said box girder, and said vehicle runway being positioned above said box girder.

21. The support structure of claim 20, wherein said girders are joined together with stiffeners.

22. The support structure of claim 11, wherein said column includes discrete components that may be joined together to form said column.

23. The support structure of claim 11, wherein a plurality of said support structures are joined together to form an elongate guideway that includes a plurality of said guideway, and an expansion joint extends between adjacent discrete sections of said plurality of said guideway.

24. The support structure of claim 11, wherein one of said column and said guideway support are hollow.

25. The support structure of claim 11, wherein one of said column and said guideway support have a rectangular cross-section.

26. The support structure of claim 11, wherein one of said column and said guideway support is an I-beam.

* * * * *